(12) United States Patent  
Urbank et al.

(10) Patent No.: US 6,745,582 B1
(45) Date of Patent: Jun. 8, 2004

(54) HVAC CONTROL METHOD FOR A REMOTE START MOTOR VEHICLE

(75) Inventors: Thomas Martin Urbank, Lockport, NY (US); Aaron P. Running, Rochester Hills, MI (US); Karma Vir Sangwan, East Amherst, NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/340,053

(22) Filed: Jan. 10, 2003

(51) Int. Cl.$^7$ ............................................. B60H 1/32
(52) U.S. Cl. ............................................ 62/133; 236/51
(58) Field of Search ................ 62/133, 230, 244; 236/51; 165/202, 42

(56) References Cited

U.S. PATENT DOCUMENTS

| | | | |
|---|---|---|---|
| 4,436,064 A | 3/1984 | Lamkewitz et al. .. 123/142.5 R |
| 5,222,661 A | * 6/1993 | Wenhart ..................... 236/49.3 |
| 5,361,593 A | * 11/1994 | Dauvergne ..................... 62/89 |
| 5,791,407 A | 8/1998 | Hammons .................... 165/202 |
| 5,896,750 A | * 4/1999 | Karl ............................. 62/236 |
| 6,158,225 A | * 12/2000 | Muto et al. .................... 62/3.7 |

* cited by examiner

Primary Examiner—Marc Norman
(74) Attorney, Agent, or Firm—Patrick M. Griffin (57) ABSTRACT

A manually controlled motor vehicle HVAC system is activated for automatically pre-heating or pre-cooling the cabin following remote starting of the vehicle engine. When the engine has been remotely started, an HVAC controller estimates initial outside air and cabin air temperatures, and determines if pre-heating or pre-cooling is appropriate based on the estimated initial temperatures, the engine coolant temperature and a measure of the engine soak time. When pre-heating or pre-cooling is deemed to be appropriate, the HVAC parameters normally set by a driver interface panel are selectively overridden based on the estimated initial outside air and cabin air temperatures. In a particularly advantageous embodiment, the initial outside air temperature is estimated based on an inlet air temperature sensor of the engine or on a refrigerant pressure sensor of the HVAC system prior to activation of the refrigerant compressor.

8 Claims, 6 Drawing Sheets

HVAC CONTROL METHOD FOR A REMOTE START MOTOR VEHICLE

TECHNICAL FIELD

This invention relates to the control of a heating, ventilation and air-conditioning (HVAC) system in a motor vehicle that is capable of being remotely started, and more particularly to a method of automatically pre-heating or pre-cooling the vehicle cabin following a remote start.

BACKGROUND OF THE INVENTION

An increasing number of motor vehicles are being equipped, most commonly as an aftermarket accessory, to enable remote starting of the vehicle engine. The primary purpose of remote starting is to pre-cool or pre-heat the vehicle cabin, particularly when the vehicle is parked outside during extreme hot or cold weather conditions, so that the cabin will be more comfortable when entered by the occupants. In a cold climate, additional measures may be taken to clear the windows of frost or snow by activating the defroster, the rear window defogger and the wipers, for example. With automatic HVAC systems, most of the required control functions occur automatically so long as the system is left in the automatic (AUTO) mode, whereas with manually controlled HVAC systems, the driver must ordinarily select appropriate blower, temperature, mode and air conditioning settings prior to exiting the vehicle. While various control strategies have been developed for essentially automating the pre-cooling or pre-heating functions in manually controlled HVAC systems, such controls are either pre-programmed, or require temperature sensors that are not typically available in a vehicle equipped with a manually controlled HVAC system. For example, the systems disclosed in the U.S. Pat. Nos. 4,436,064 and 5,791,407 require outside air and cabin air temperature sensors. Accordingly, what is needed is an improved remote-start HVAC control method that utilizes commonly available sensor information to provide appropriate pre-heating or pre-cooling of the vehicle cabin.

SUMMARY OF THE INVENTION

The present invention is directed to an improved method of activating a manually controlled HVAC system for automatically pre-heating or pre-cooling the vehicle cabin following a remote start, wherein commonly available engine and HVAC sensor information is utilized to activate and maintain appropriate HVAC settings. When the engine has been remotely started, an HVAC controller estimates initial outside air and cabin air temperatures, and determines if pre-heating or pre-cooling is appropriate based on the estimated initial temperatures, the engine coolant temperature and a measure of the engine soak time. When pre-heating or pre-cooling is deemed to be appropriate, the HVAC parameters normally set by a driver interface panel are selectively overridden based on the estimated initial outside air and cabin air temperatures. In a particularly advantageous embodiment, the initial outside air temperature is estimated based on an inlet air temperature sensor of the engine or on a refrigerant pressure sensor of the HVAC system prior to activation of the refrigerant compressor.

BRIEF DESCRIPTION OF THE DRAWINGS

FIGS. 8A and 8B graphically depict warm-up time for the pre-heating control described by the flow diagram of FIG. 5. FIG. 8A depicts the warm-up time for a vehicle in which the blower motor voltage is not controllable, whereas

FIGS. 10A and 10B graphically depict cool-down time for the pre-cooling control described by the flow diagram of FIG. 6. FIG. 10A depicts the cool-down time for a vehicle in which the blower motor voltage is not controllable, whereas

DESCRIPTION OF THE PREFERRED EMBODIMENT

Figure 1:
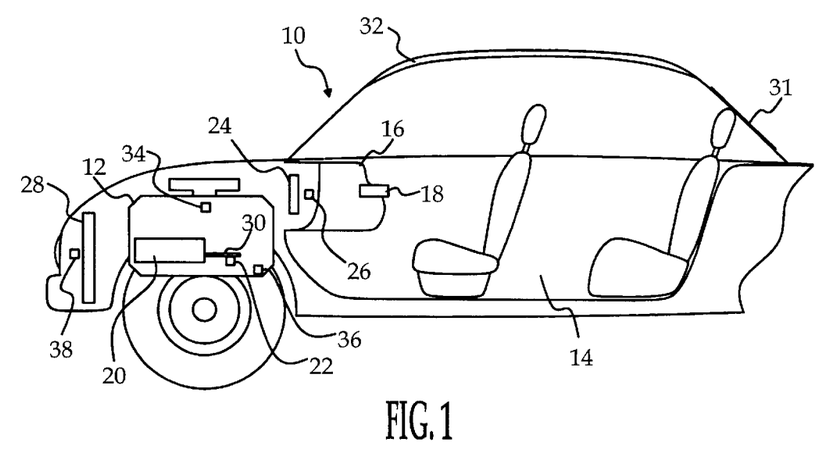
FIG. 1 depicts a motor vehicle, and various measured parameters according to this invention.

Referring to FIG. 1, the reference numeral 10 generally designates a motor vehicle. The vehicle 10 is driven by an internal combustion engine 12, and includes a passenger compartment or cabin 14, an instrument panel 16, and a driver interface panel 18 for a heating, ventilation and air conditioning (HVAC) system. The HVAC system is described in some detail in FIG. 2, whereas FIG. 1 depicts only selected components, including a refrigerant compressor 20, a high side pressure sensor 22, an evaporator 24, an evaporator outlet air temperature sensor 26 and a condenser 28. The compressor 20 is driven by the engine 12, and the sensor 22 is responsive to the refrigerant pressure in the compressor discharge pipe 30. A blower directs air through the evaporator 24, and the sensor 26 is responsive to the air temperature just downstream of evaporator 24. As also detailed in FIG. 2, the interface panel 18 is provided with a number of knobs or levers that are manipulated by the driver or other occupants to enable or disable air conditioning and cabin air recirculation, and to set various HVAC control parameters, such as the blower speed and the air discharge temperature and location. In the illustrated embodiment, the vehicle 10 is additionally equipped with an electric rear window defogger 31 that is selectively activated by the interface panel 18 to clear the rear glass of fog, frost or ice.

The actual temperature of the cabin air (Tcabin) can be measured by a suitable sensor mounted in the instrument panel 16 or cabin headliner 32 although most vehicles with manually controlled HVAC systems do not include a cabin temperature sensor for cost reasons. However, most vehicles do include two or more engine-related temperature sensors, including an intake manifold air temperature sensor 34 and a coolant temperature sensor 36. In vehicles including an outside air temperature sensor 38, it is typically located upstream of the condenser 28 as shown.

Figure 2:
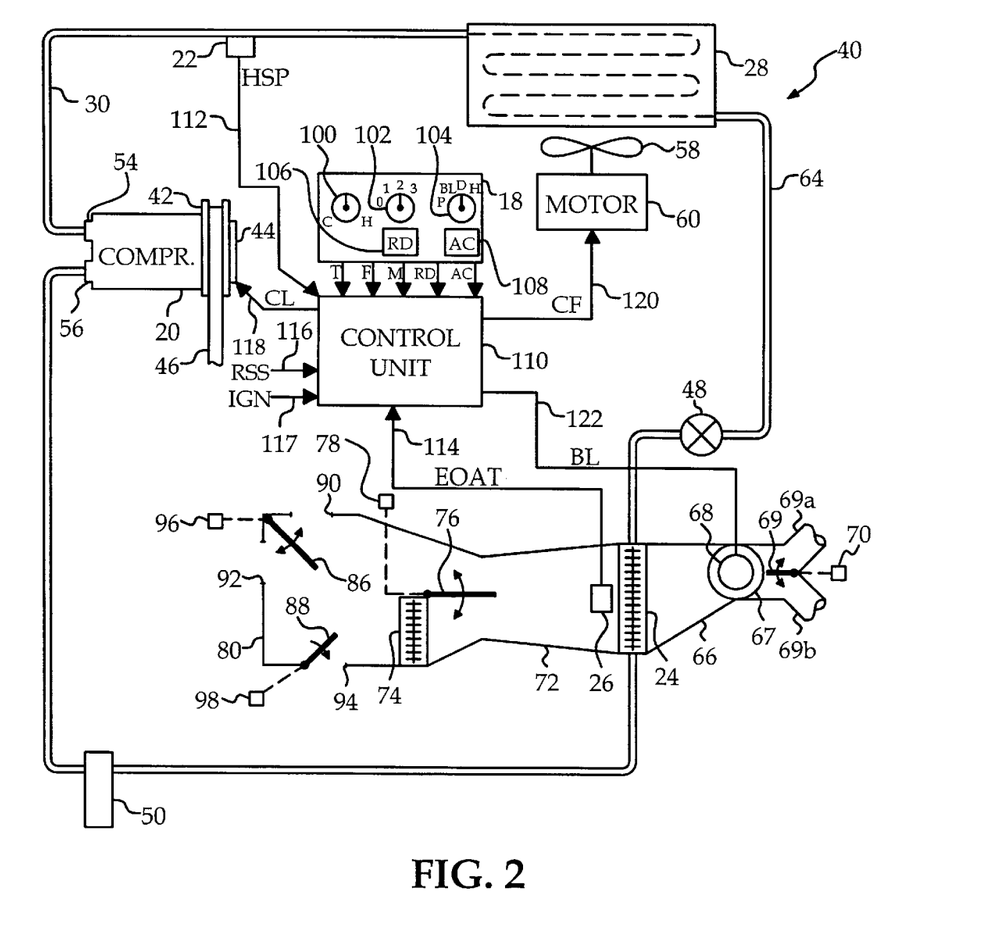
FIG. 2 is a diagram of an HVAC system for the vehicle of FIG. 1, including a microprocessor-based control unit.

Referring to FIG. 2, the HVAC system is generally designated by the reference numeral 40. The compressor 20 is coupled to engine 12 via drive pulley 42, clutch 44 and drive belt 46. In the illustrated embodiment, the compressor 20 has a fixed stroke, and is cycled on and off via clutch 44 to control its capacity, but the method of this invention equally applies to systems where the stroke or displacement of the compressor 20 is adjustable to achieve capacity control. The condenser 28, an orifice tube 48, the evaporator 24, and an accumulator/dehydrator 50 arranged in order between the compressor discharge port 54 and suction port 56. A cooling fan 58, operated by an electric drive motor 60, is controlled to provide supplemental air flow through the condenser 28. The orifice tube 48 allows the cooled high pressure refrigerant in line 64 to expand in an isenthalpic process before passing through the evaporator 24. The accumulator/dehydrator 50 separates low pressure gaseous and liquid refrigerant, directs a gaseous portion to the compressor suction port 56, and acts as a reservoir for the reserve refrigerant charge. In an alternative system configuration, the orifice tube 48 is replaced with a thermostatic expansion valve (TXV); in this case, the accumulator/dehydrator 50 is omitted, and a receiver/drier (R/D) is inserted in line 64 upstream of the TXV to ensure that sub-cooled liquid refrigerant is supplied to the inlet of the TXV.

The evaporator 24 is formed as an array of finned refrigerant conducting tubes, and an air intake duct 66 disposed on one side of evaporator 24 houses an inlet air blower 67 driven by an electric blower motor 68 to force air past the evaporator tubes. The duct 66 is bifurcated upstream of the blower 67, and an inlet air control door 69 is adjustable as shown to control inlet air mixing. Depending on the door position, outside air may enter blower 67 through duct leg 69*a*, and cabin air may enter blower 67 through duct leg 69*b*. An actuator 70 is mechanically coupled to the inlet air control door 69 to control its position.

An air outlet duct 72 disposed on the downstream side of blower 67 and evaporator 24 houses a heater core 74 formed as an array of finned tubes that conduct engine coolant. The outlet duct 72 is bifurcated with the heater core 74 disposed in one air stream of duct 72. A temperature control door 76 is adjustable as shown to control what proportion of air exiting evaporator 24 must pass through the heater core 74. An actuator 78 is mechanically coupled to the temperature control door 76 to control its position. The heated and un-heated air portions are mixed in a plenum portion 80 of outlet duct 72 downstream of heater core 74 and temperature control door 76, and a pair of mode control doors 86, 88 direct the mixed air through one or more outlets, including a defrost outlet 90, a panel outlet 92, and a heater outlet 94. An actuator 96 is mechanically coupled to the mode control door 86 to control its position, and an actuator 98 is mechanically coupled to the mode control door 88 to control its position.

The driver interface panel 18 includes a set of control knobs 100, 102, 104 for respectively selecting the air discharge temperature, the blower speed and the air discharge location (mode). Additionally, a switch 106 (RD) controls activation of a rear window defogger, and a switch 108 (AC) enables and disables air conditioning. Signals (T, F, M, RD, AC) corresponding to the position of the knobs 100, 102, 104 and switches 106, 108, respectively, are supplied to a microprocessor-based control unit 110. The control unit 110 receives additional input signals such as the high-side pressure signal (HSP) on line 112, the evaporator outlet air temperature signal (EOAT) on line 114, the remote start status signal (RSS) on line 116 and the ignition switch status (IGN) on line 117, and develops control signals for the clutch 12, the blower motor 68, the condenser fan motor 60, and the door position actuators 70, 78, 96, 98, primarily in response to the signals received from the driver interface panel 18. The output signal CL for the clutch 16 appears on line 118, the output signal CF for condenser fan motor 60 appears on line 120, and the output signal BL for controlling blower motor 68 appears on line 122; for simplicity, output signals for the door position actuators 70, 78, 96, 98 and the rear window defogger 31 have been omitted.

The present invention is directed to a method of operation for the control unit 110 that selectively overrides the HVAC settings of the driver interface panel 18 when the engine 12 is remotely started, as indicated by the RSS input on line 116. The RSS signal is typically developed by an engine controller (not shown), and changes to a predefined state after a successful remote start of engine 12. At such point, the control unit 110 determines the initial outside air temperature OAT_INIT and the initial cabin air temperature CABIN_INIT, and then determines how the HVAC system 40 should be activated based on the determined initial temperatures, the coolant temperature CT and a Soak Timer that essentially measures the time elapsed since the engine 12 was previously turned off. If it appears that pre-warming or pre-cooling are not warranted, the HVAC system 40 is activated based on the settings of driver interface panel 18; if it appears that pre-warming or pre-cooling is warranted, the settings of driver interface panel 18 are selectively ignored, and the HVAC system 40 is activated to pre-warm or pre-cool the cabin 14.

Figure 4:
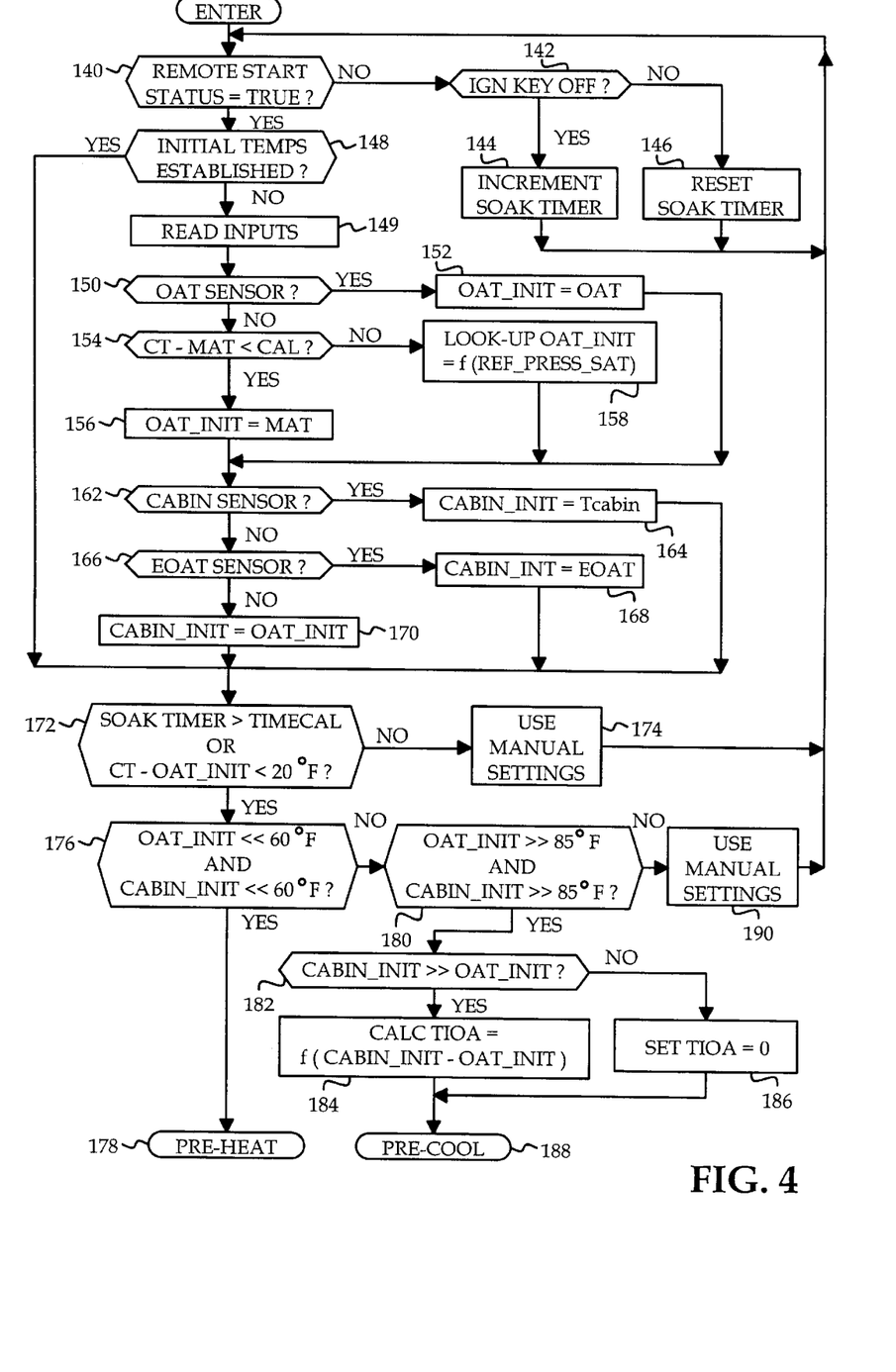
FIG. 4 is a high level flow diagram representing a software routine executed by the control unit of FIG. 2 in carrying out the method of this invention.
Figure 5:
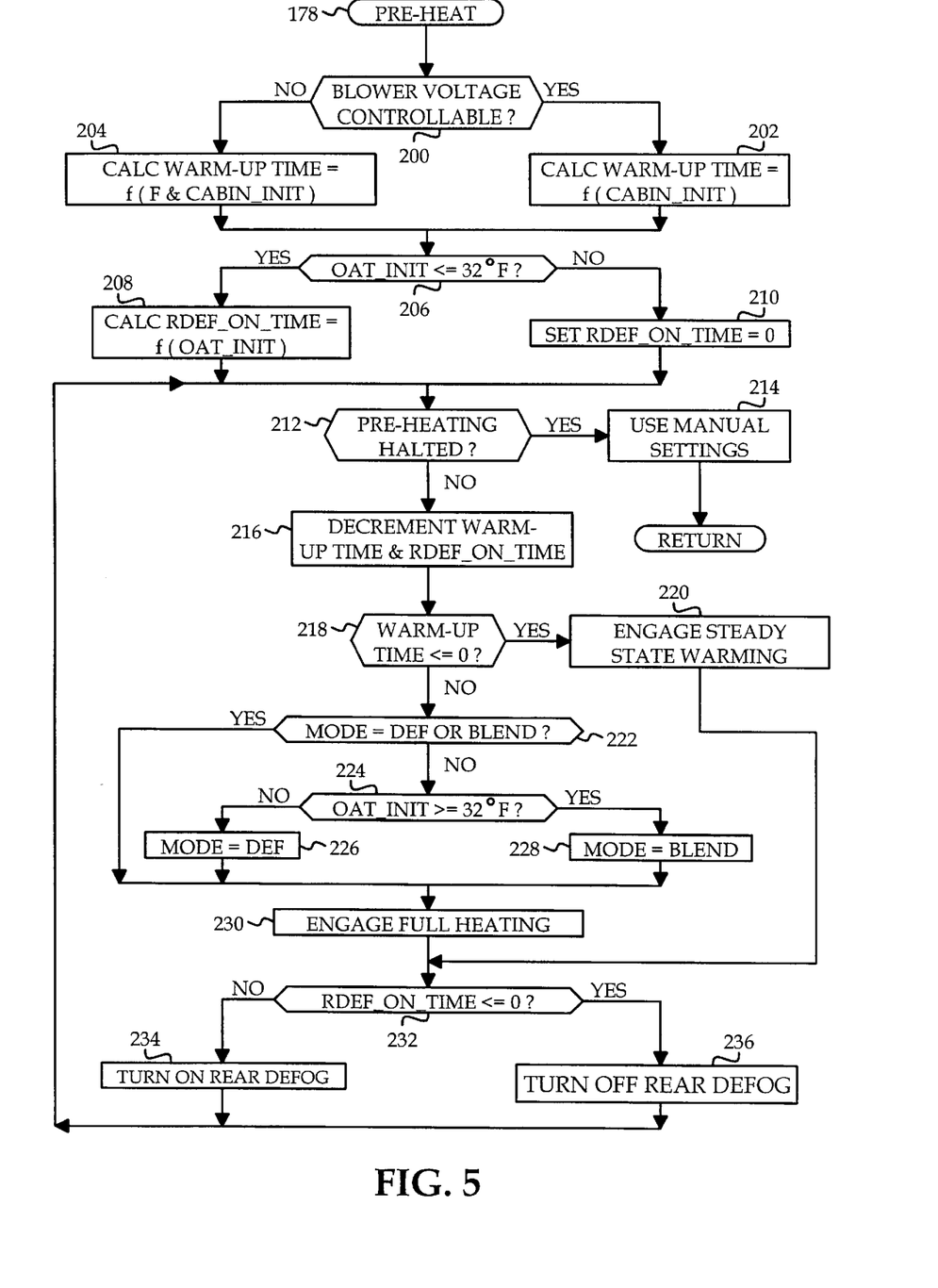
FIG. 5 is a flow diagram detailing a portion of the flow diagram of FIG. 4 for pre-heating the vehicle of FIG. 1 according to this invention.
Figure 6:
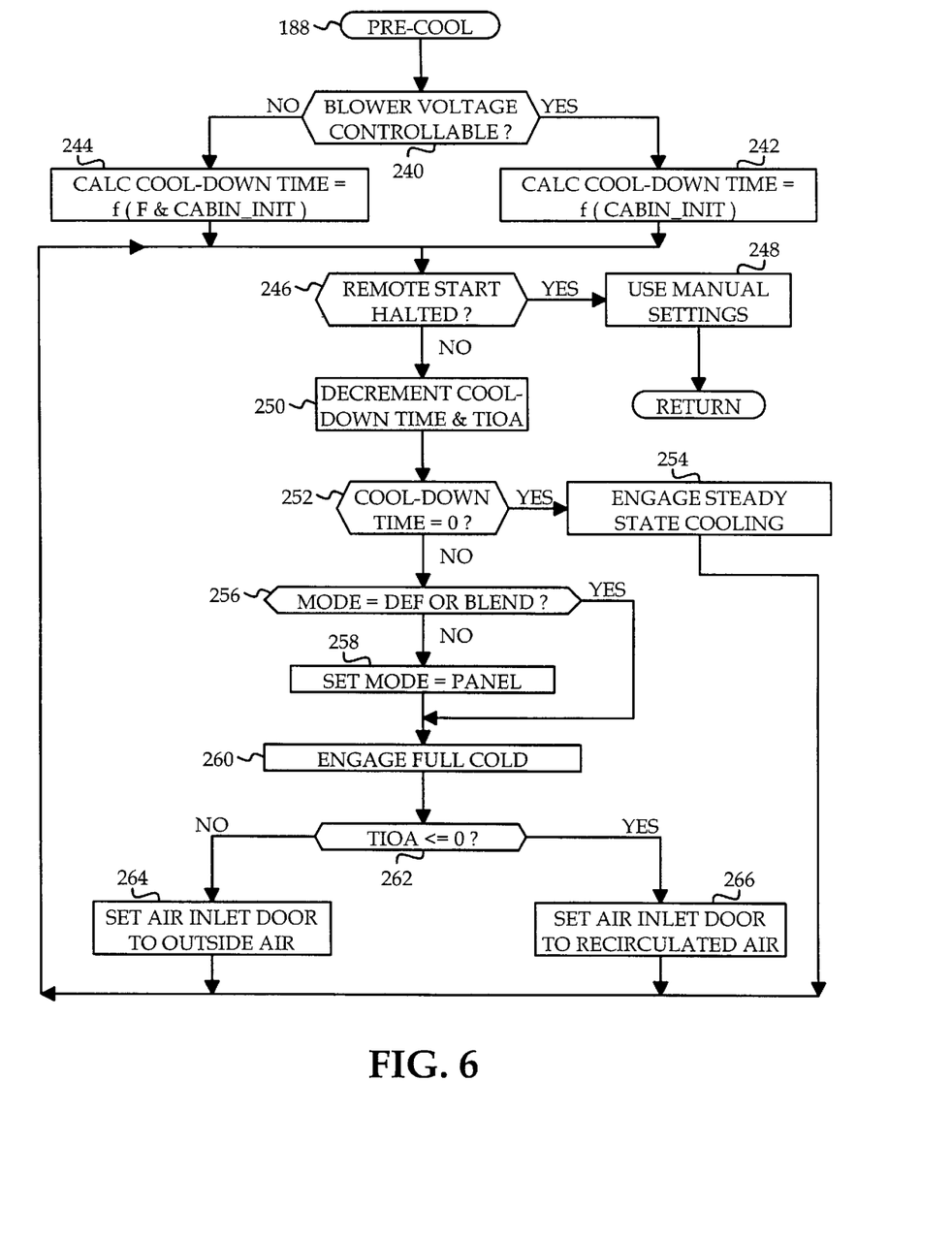
FIG. 6 is a flow diagram detailing a portion of the flow diagram of FIG. 4 for pre-cooling the vehicle of FIG. 1 according to this invention.

The flow diagram of FIGS. 4, 5 and 6 depict the functionality of a software routine that is executed by the control unit 110 for carrying out the above-mentioned control method. Referring to FIG. 4, the block 140 is first executed to determine if a Remote Start Status flag corresponding to the RSS input on line 116 is True (that is, if the engine 12 has been remotely started). If not, the blocks 142, 144, 146 are executed to update the Soak Timer. If the ignition key is off, the block 144 increments the Soak Timer; otherwise, the block 146 resets the Soak Timer to zero. Thus, when the Remote Start Status flag transitions from False to True, the count in the Soak Timer will represent the time elapsed since the engine 12 was previously turned off. When the Remote Start Status flag is True, block 140 is answered in the affirmative, and the block 148 determines if the initial outside and cabin air temperatures OAT_INIT, CABIN_INIT have already been established. Initially, block 148 will be answered in the negative, and the blocks 149 and 150–170 are executed to respectively read the various sensor values and establish the values of OAT_INIT and CABIN_INIT.

Figure 3:
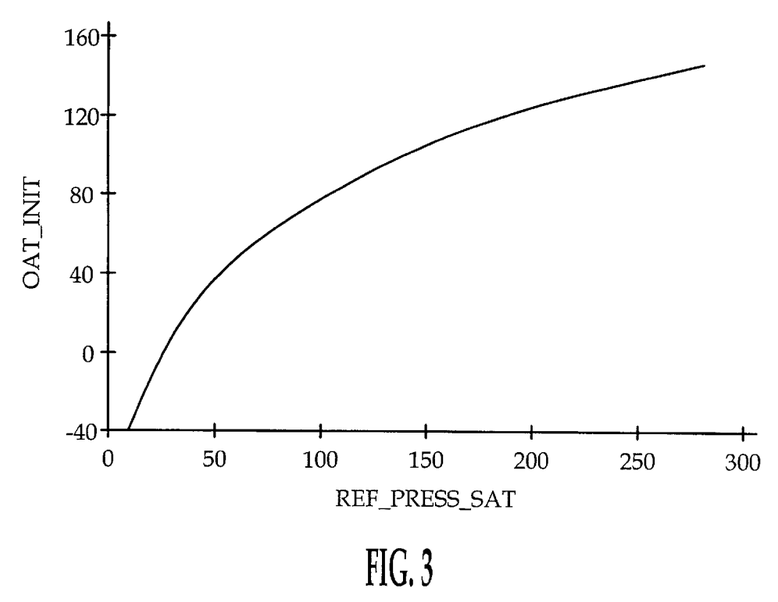
FIG. 3 is graph depicting a temperature vs. pressure relationship of saturated refrigerant for the HVAC system of FIG. 2.

If the vehicle 10 is equipped with an outside air temperature sensor 38, the blocks 150 and 152 set OAT_IMT to the measured temperature OAT. Most likely, however, the vehicle 10 does not have an outside air temperature sensor, and the block 154 compares the difference (CT−MAT) to a calibrated value CAL, such as 20° F. If MAT is not more than 20° F. lower than CT, MAT is a reliable indicator of the outside air temperature, and the block 156 sets OAT_INIT to MAT. If CT is at least 20° F. higher than MAT, the presence of residual engine heat is assumed, and the block 158 is executed to initialize OAT_INIT based on the output HSP of high side refrigerant pressure sensor 22. The output signal HSP prior to engagement of the compressor clutch 44 is a measure of the saturated refrigerant pressure (referred to herein as REF_PRESS_SAT), and there is a predictable and highly reliable relationship between REF_PRESS_SAT and the temperature of the refrigerant. Since the refrigerant conduits, such as the compressor discharge pipe 30, are typically exposed to atmospheric air, OAT_INIT can therefore be reliably estimated as a function of REF_PRESS_SAT; for example, FIG. 3 graphically depicts OAT_INIT vs. REF_PRESS_SAT for the refrigerant R134a. Of course, the relationship between REF_PRESS_SAT and OAT_INIT depends on the chemical composition of the refrigerant, and will be different than shown if a different refrigerant is used.

If the vehicle 10 is equipped with a cabin air temperature sensor, the blocks 162 and 164 set CABIN_INIT to the measured temperature Tcabin. While most vehicles with manually activated HVAC systems will not have a cabin air temperature sensor due to cost as mentioned above, it is possible for purposes of the present invention to include a thermistor in the circuitry of the driver interface panel 18 or control unit 110 without appreciably adding to the system cost, and the measured temperature when the engine 12 is remotely started will provide a reasonably accurate measure of the cabin air temperature. Otherwise, the blocks 166 and 168 set CABIN_INIT to the evaporator outlet air temperature EOAT since the sensor 26 is typically located very close to the cabin 14, and is influenced to at least some degree by the solar intensity to which the cabin 14 is exposed. However, not all HVAC systems include an EOAT sensor 26, and in such case, the blocks 166 and 170 set CABIN_INIT equal to OAT_INIT.

Figure 7:
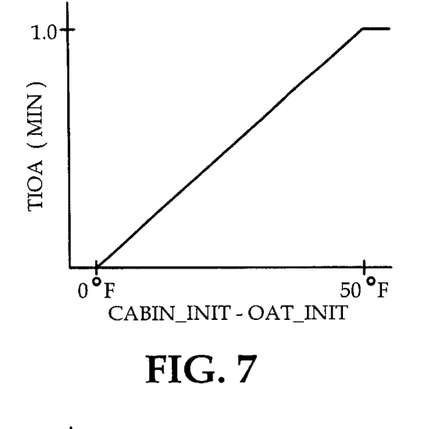
FIG. 7 graphically depicts time-in-outside-air for the pre-cooling control described by the flow diagram of FIG. 6.

Once OAT_INIT and CABIN_INIT have been established, the block 172 determines if the Soak Timer is greater than a calibrated value TIMECAL (such as three hours), or if the engine coolant temperature CT is not more than a calibrated value (such as 20° F.) above OAT_INIT. If neither condition is true, the block 174 is executed to activate the HVAC system 40 based on the settings of the driver interface panel 18. If at least one of the conditions of block 172 is true, the engine 12 is deemed to have been inactive for a prolonged period, and the block 176 determines if pre-heating is appropriate. If OAT_INIT and CABIN_INIT are both significantly less than a low reference temperature such as 60° F., pre-heating of the cabin 14 is deemed appropriate, and the pre-heat routine depicted by the flow diagram of FIG. 5 is executed, as indicated by the block 178. If the block 176 is answered in the negative, the block 180 is executed to determine if pre-cooling is appropriate. If OAT_NIT and CABIN_INIT are both significantly greater than a high reference temperature such as 85° F., pre-cooling of the cabin 14 is deemed appropriate; the blocks 182, 184 and 186 determine the time-in-outside-air (TIOA), and then the pre-cool routine depicted by the flow diagram of FIG. 6 is executed, as indicated by the block 188. Blocks 184 sets TIOA as a predefined function of the difference (CABIN_INIT-OAT_INIT) if CABIN_INIT is significantly greater than OAT_INIT (indicating significant solar heating of the cabin 10); an exemplary relationship between TIOA and the difference (CABIN_INIT-OAT_INIT) is graphically depicted in FIG. 7. On the other hand, the block 186 sets TIOA equal to zero if CABIN_INIT is not significantly greater than OAT_INIT. If block 180 is answered in the negative, neither pre-heating nor pre-cooling is considered to be appropriate, and the block 190 activates the HVAC system 40 based on the settings of the driver interface panel 18.

Figure 8A:
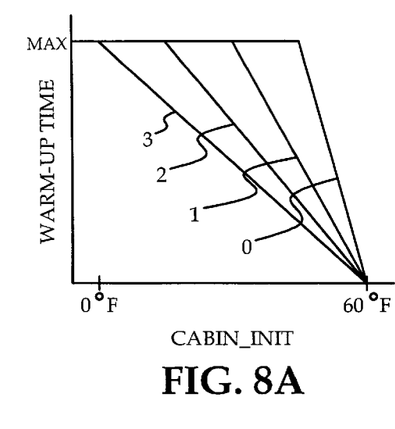
Figure 8B:
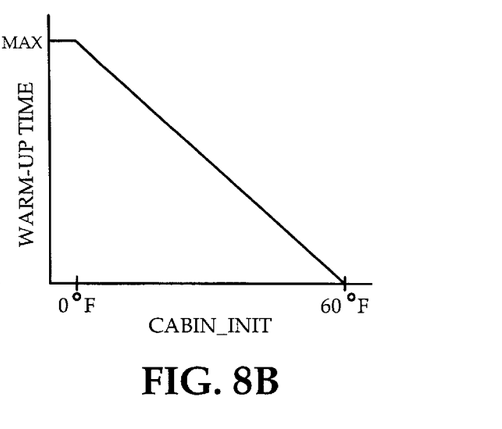
FIG. 8B depicts the warm-up time for a vehicle in which the blower motor voltage is controllable.
Figure 9:
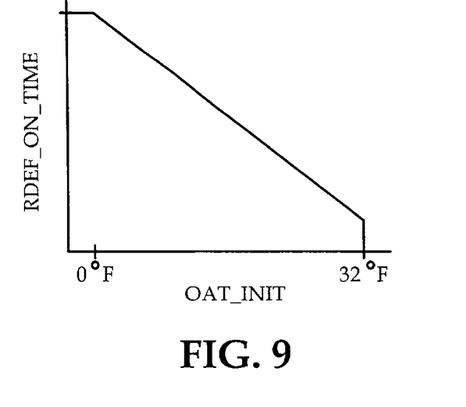
FIG. 9 graphically depicts the rear defogger on-time for the pre-heating control described by the flow diagram of FIG. 5.

Referring to FIG. 5, the pre-heating routine designated by block 178 is represented by the blocks 200–236. If the HVAC system 40 is designed as shown such that the control unit 110 controls the blower motor voltage (for blower speed control), the block 200 is answered in the affirmative, and the block 202 calculates the Warm-Up Time of the cabin based on CABIN_INIT, assuming that the blower motor 68 will be operated at full speed during the warm-up period; a representative relationship between Warm-Up Time and CABIN_INIT is graphically depicted in FIG. 8B. In some HVAC systems, however, the blower motor voltage is controlled directly by the driver interface panel 18, and the control unit 110 cannot control the blower motor voltage. In such case, the block 200 is answered in the negative, and the block 204 calculates the Warm-Up Time based on CABIN_INIT and the manually set blower speed F; a representative relationship between Warm-Up Time and CABIN_INIT for four different blower motor speeds (corresponding to the settings 0, 1, 2 and 3 shown in FIG. 2) is graphically depicted in FIG. 8A. The Warm-Up Time is limited to a predefined time MAX (such as twenty minutes) in any case. The blocks 206, 208 and 210 then determine the activation time RDEF_ON_TIME of the rear window defogger 31. If OAT_INIT is 32° F. or less, the block 208 calculates RDEF_ON_TIME as a predefined function of OAT_INIT, as indicated for example by the graph of FIG. 9. If OAT_INIT is greater than 32° F., the block 210 sets DEF_ON_TIME equal to zero. The block 212 then determines if a specified condition for interrupting pre-heating has occurred; such conditions may include, for example, an ignition key-on or opening of a driver door. If one or more of the specified conditions is detected, the block 214 terminates the preheat routine and activates the HVAC system 40 based on the settings of the driver interface panel 18. The block 216 decrements the Warm-Up Time determined at blocks 202 or 204, and the RDEF_ON_TIME determined at blocks 208 or 210. The block 218 detects when the Warm-Up Time has been decremented to zero. Initially, the Warm-Up Time is non-zero, and the blocks 222–230 engage a Full Heat mode of operation for maximizing heating of the cabin air. The blocks 222, 224, 226, 228 set the Mode to the Defrost or Blend settings depending on whether OAT_INIT is above or below 32° F., and the block 230 activates Full Heat settings of the HVAC system 40. Typically, the block 230 will force the temperature signal T to a max-heat setting and the fan signal F to High. The air conditioning request signal AC may also be activated to request operation of compressor 20, and the air inlet control door 69 may be positioned to receive full outside air; these settings help to maintain the glass surfaces of the vehicle 10 free of fog and frost. Once the Warm-Up Time has been decremented to zero, the block 220 engages a Steady State Warming mode of operation to prevent over-heating of the cabin 14; in the illustrated embodiment, this essentially involves lowering the blower speed to the setting of the interface panel control knob 102. Finally, the blocks 232, 234, 236 activate or deactivate the rear window defogger 31 based on the value of RDEF_ON_TIME, and the blocks 212–236 are then re-executed as shown.

Figure 10A:
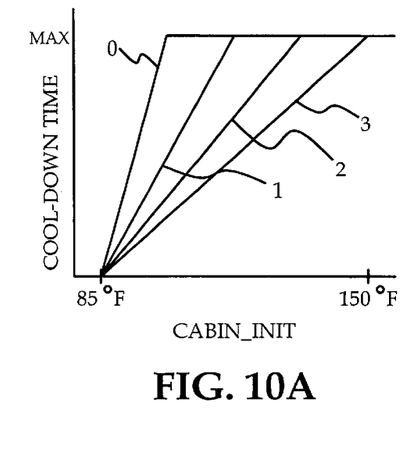
Figure 10B:
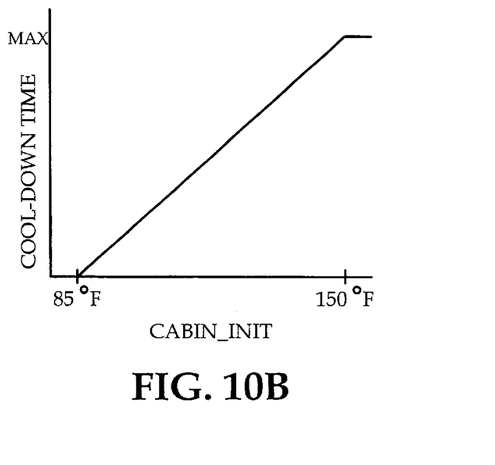
FIG. 10B depicts the cool-down time for a vehicle in which the blower motor voltage is controllable.

Referring to FIG. 6, the pre-cooling routine designated by block 188 is represented by the blocks 240–266. If the HVAC system 40 is designed as shown such that the control unit 110 controls the blower motor voltage (for blower speed control), the block 240 is answered in the affirmative, and the block 242 calculates the Cool-Down Time of the cabin based on CABIN_INIT, assuming that the blower motor 68 will be operated at full speed during the cool-down period;

a representative relationship between Cool-Down Time and CABIN_INIT is graphically depicted in FIG. 10B. In some HVAC systems, however, the blower motor voltage is controlled directly by the driver interface panel 18, and the control unit 110 cannot control the blower motor voltage. In such case, the block 240 is answered in the negative, and the block 244 calculates the Cool-Down Time based on CABIN_INIT and the manually set blower speed F; a representative relationship between Cool-Down Time and CABIN_INIT for four different blower motor speeds (corresponding to the settings 0, 1, 2 and 3 shown in FIG. 2) is graphically depicted in FIG. 10A. The Cool-Down Time is limited to a predefined time MAX (such as twenty minutes) in any case. The block 246 then determines if a specified condition for interrupting pre-cooling has occurred; such conditions may include, for example, an ignition key-on or opening of a driver door. If one or more of the specified conditions is detected, the block 248 terminates the pre-cooling routine and activates the HVAC system 40 based on the settings of the driver interface panel 18. The block 250 decrements the Cool-Down Time determined at blocks 242 or 244, and the time-in-outside-air TIOA determined at blocks 184 or 186. The block 252 then detects when the Cool-Down Time has been decremented to zero. Initially, the Cool-Down Time is non-zero, and the blocks 256–266 engage a Full Cool mode of operation for maximizing cooling of the cabin air. The blocks 256 and 258 set the Mode to the Panel setting unless the Defrost or Blend (a predefined combination of Defrost and Panel) settings have been selected by the driver interface panel 18, and the block 260 activates Full Cold settings of the HVAC system 40. Typically, the block 260 will force the temperature signal T to a max-cool setting, the fan signal F to High, and the AC signal to request compressor operation. Also, the blocks 262 and 264 set the air inlet control door 69 to full outside air until the TIOA value determined at blocks 184 or 186 of FIG. 4 has been decremented to zero; thereafter, the block 266 sets the air inlet control door 69 to full cabin air recirculation as shown. Once the Cool-Down Time has been decremented to zero, the block 254 engages a Steady State Cooling mode of operation to prevent unnecessary cooling of the cabin 14; in the illustrated embodiment, this essentially involves lowering the blower speed to the setting F of the interface panel control knob 102, and positioning the air inlet control door 69 to full cabin air recirculation. The blocks 246–266 are then re-executed as shown.

In summary, the present invention provides a practical way of automatically pre-heating or pre-cooling the cabin of a vehicle that is equipped with a manually controlled HVAC system. Commonly available engine and HVAC system parameters are used to estimate the initial outside air and cabin air temperatures so that dedicated cabin air temperature and outside air temperature sensors are not required. When pre-heating or pre-cooling is appropriate, the HVAC parameters normally set by the driver interface panel are selectively overridden based on the estimated initial outside air and cabin air temperatures. While described in reference to the illustrated embodiments, it is expected that various modifications in addition to those suggested above will occur to those skilled in the art. For example, the various time and temperature values mentioned in respect to the flow diagrams may vary depending on the system characteristics or on design preference, the control may have greater or lesser functionality than shown, and so forth. Accordingly, it should be understood that the scope of this invention is not limited to the illustrated embodiment, and that controls incorporating such modifications may fall within the intended breadth of the appended claims.

What is claimed is:

1. A method of operating a manually controlled HVAC system that is installed in a motor vehicle having an engine that can be remotely started, wherein the engine includes temperature sensors responsive to engine coolant and engine inlet air, the method comprising the steps of:
   obtaining an initial coolant temperature from the engine coolant temperature sensor and an initial inlet air temperature from the engine inlet air temperature sensor when remote starting occurs;
   estimating an initial outside air temperature according to the initial inlet air temperature so long as the initial inlet air temperature is not more than a calibrated amount below the initial coolant temperature;
   estimating an initial temperature of air in a cabin of the vehicle;
   determining if the engine has been inactive for a prolonged period; and
   activating the HVAC system for pre-heating or pre-cooling said cabin if the engine has been inactive for a prolonged period, and the estimated initial cabin air and outside air temperatures are outside a predefined temperature range.

2. A method of operating a manually controlled HVAC system that is installed in a motor vehicle having an engine that can be remotely started, wherein the HVAC system includes a pressure sensor responsive to a refrigerant of said HVAC system, the method comprising the steps of:
   obtaining an initial refrigerant pressure from the refrigerant pressure sensor when remote starting occurs, and prior to activation of said HVAC system;
   determining an initial refrigerant temperature corresponding to said initial refrigerant pressure, and estimating an initial outside air temperature according to the initial refrigerant temperature;
   estimating an initial temperature of air in a cabin of the vehicle;
   determining if the engine has been inactive for a prolonged period; and
   activating the HVAC system for pre-heating or pre-cooling said cabin if the engine has been inactive for a prolonged period, and the estimated initial cabin air and outside air temperatures are outside a predefined temperature range.

3. The method of claim 2, wherein the engine includes temperature sensors responsive to engine coolant and engine inlet air, and the method includes the steps of:
   obtaining an initial coolant temperature from the engine coolant temperature sensor and an initial inlet air temperature from the engine inlet air temperature sensor when remote starting occurs; and
   estimating the initial outside air temperature according to the initial refrigerant temperature if the initial coolant temperature is at least a calibrated amount higher than the initial inlet air temperature, and otherwise according to the initial inlet air temperature.

4. A method of operating a manually controlled HVAC system that is installed in a motor vehicle having an engine that can be remotely started, wherein the engine includes a temperature sensor responsive to engine coolant, the method comprising the steps of:
   estimating an initial temperature of air in a cabin of the vehicle and an initial outside air temperature;
   obtaining an initial coolant temperature from the engine coolant temperature sensor when remote starting occurs;

determining that the engine has been inactive for a prolonged period if the initial coolant temperature is not more than a calibrated amount above the estimated initial outside air temperature; and activating the HVAC system for pre-heating or pre-cooling said cabin if it is determined that the engine has been inactive for a prolonged period, and the estimated initial cabin air and outside air temperatures are outside a predefined temperature range.

5. The method of claim 4, wherein the vehicle includes a driver-activated ignition switch, and the method includes the steps of:

measuring a soak time based on an elapsed time following an on-to-off transition of said ignition switch; and determining if the engine has been inactive for a prolonged period if the soak time is greater than a reference time or the initial coolant temperature is not more than a calibrated amount above the estimated outside air temperature.

6. A method of operating a manually controlled HVAC system that is installed in a motor vehicle having an engine that can be remotely started, comprising the steps of:

estimating an initial temperature of air in a cabin of the vehicle and an initial outside air temperature;

determining if the engine has been inactive for a prolonged period;

activating the HVAC system for pre-heating or pre-cooling said cabin if the engine has been inactive for a prolonged period, and the estimated initial cabin air and outside air temperatures are outside a predefined temperature range; and determining a warm-up or cool-down time according to the estimated initial cabin air temperature and a blower speed of said HVAC system.

7. The method of claim 6, wherein the HVAC system includes a defrost mode in which conditioned air is directed onto a windshield of the vehicle, and the step of activating the HVAC system includes the step of:

activating the defrost mode if the estimated initial outside air temperature is below a reference temperature and the determined warm-up time has not elapsed.

8. A method of operating a manually controlled HVAC system that is installed in a motor vehicle having an engine that can be remotely started, wherein the vehicle includes a rear window defogger, the method comprising the steps of:

estimating an initial temperature of air in a cabin of the vehicle and an initial outside air temperature;

determining if the engine has been inactive for a prolonged period; and if the engine has been inactive for a prolonged period, and the estimated initial cabin air and outside air temperatures are outside a predefined temperature range, activating the HVAC system for pre-heating or pre-cooling said cabin and activating the rear window defogger for a time interval based on the estimated initial outside air temperature.

* * * * *